United States Patent [19]

Wissinger et al.

[11] 3,784,345
[45] Jan. 8, 1974

[54] APPARATUS FOR THE EXTRUSION OF HOLLOW ARTICLES

[75] Inventors: Waldemar Wissinger, Siegburg; Josef Kurth, Troisdorf; Peter Gauchel, Eitorf-Alzenbach, all of Germany

[73] Assignee: Dyamit Nobel Aktiengesellschaft

[22] Filed: Oct. 20, 1971

[21] Appl. No.: 190,772

[30] Foreign Application Priority Data
Nov. 12, 1970  Germany................. P 20 55 628.9

[52] U.S. Cl................................ 425/325, 425/380
[51] Int. Cl.............................................. B29d 23/04
[58] Field of Search................. 425/324, 325, 326, 425/376, 377, 378, 379, 380, 383, 384, 466, 467, 392, 393

[56]  References Cited
UNITED STATES PATENTS

| | | | |
|---|---|---|---|
| 3,288,317 | 11/1966 | Wiley | 425/326 X |
| 3,402,682 | 9/1968 | Peden et al. | 425/465 |
| 3,488,809 | 1/1970 | James | 425/327 |
| 3,702,224 | 11/1972 | North et al. | 425/326 X |

*Primary Examiner*—R. Spencer Annear
*Attorney*—Craig, Antonelli and Hill

[57] ABSTRACT

An apparatus for the extrusion of hollow articles of thermoplastic synthetic resin includes an extruded tool and a sizing device adjacent the extruding tool where the hollow article is drawn therefrom. The sizing device has a minor conicity so that the outlet opening in the sizing device is smaller than the inlet opening so that the shrinkage of the dimensions of the article is compensated for. A cooling device may be inserted within a hollow chamber of the article and in addition be externally coupled to the surface of the extruded article as it is drawn through the sizing device.

19 Claims, 6 Drawing Figures

PATENTED JAN 8 1974 3,784,345

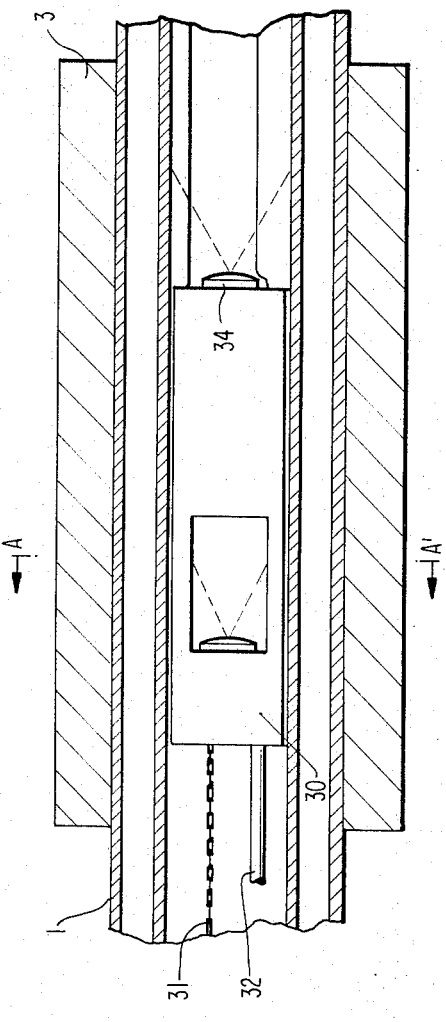
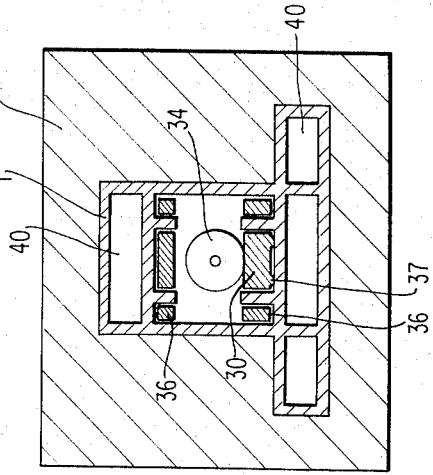
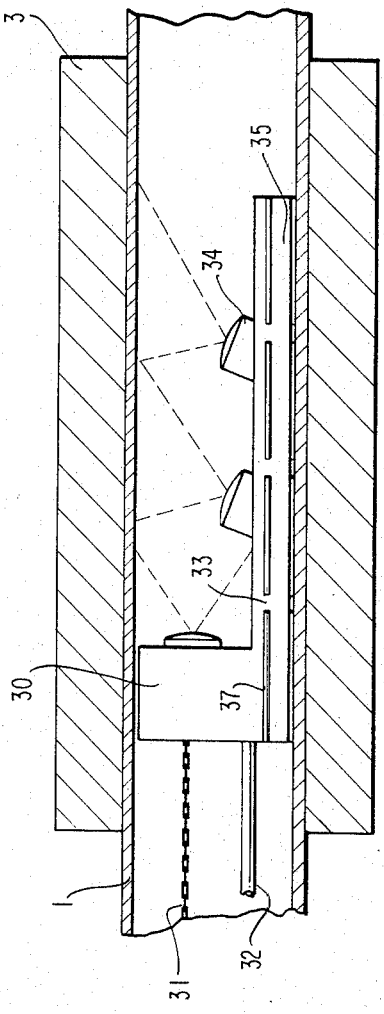
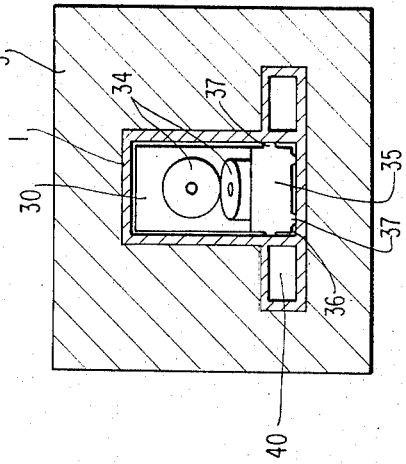

APPARATUS FOR THE EXTRUSION OF HOLLOW ARTICLES

The present invention relates to an apparatus for the extrusion of hollow articles from thermoplastic synthetic resins, which articles exhibit one or more inner chambers or interiorly disposed webs, ribs or walls, wherein internal cooling as well as external cooling are simultaneously employed. With the aid of this apparatus it is possible, for example, to manufacture pipes or window profiles from hard polyvinylchloride.

In the conventional modes of operation, the hollow profiles are produced by extrusion in such a manner that the exiting, still plastic profiled produce passes through the gauge or a sizing device. Through this procedure, the hollow article is engated within the gauge or the sizing device by inner excess pressure or an external vacuum and cooled from the outside during passage through this device. The hollow article solidifies and assumes, on the outside, extensively the shape of the sizing device.

The disadvantages of this conventional process reside in that the hollow articles of thermoplastic synthetic resin, which exhibit one or more internal chambers and/or interiorly disposed webs and lugs, are subjected to a completely nonuniform cooling between the internal and external surfaces. In this process, the extrusion speed is low, because the heat is removed only from the outside. Since the internal surface cools gradually and at a substantially later point in time, high stresses occur between internal and external surfaces resulting in warping in both the radial and longitudinal directions. Entirely symmetrical cross sections, such as, for example, pipes, do not incur any apparent warping. However, the high stresses become noticeable during the cutting and further processing of the pipes. Profiles with planar walls, for example, suffer bulges on the surface areas.

A suggestion has been made to eliminate the aforementioned disadvantages, namely to provide that, during the sizing of a hollow article, the latter is pressed, by the use of subatmospheric pressure (vacuum) or internal pressure (supporting air), in its final cross-sectional dimensions, into contact with a gauge or a sizing device on the inside of the latter and is cooled externally in a direct or indirect manner, the inner chambers and the inner walls being likewise cooled in the same region and at the same time. Thereby, an extensively uniform cooling is obtained on the inner well as outer surfaces.

For this purpose, a cooling medium is introduced by means of a hose line or a pipeline into one or more internal chambers of this hallow article in the zone of the sizing device.

During extrusion with the use of internal pressure, the cooling medium is utilized for producing the internal pressure with the aid of a cooling mandrel. Furthermore, it is advantageous to allow the cooling medium to flow countercurrently to the extrusion direction.

When extruding with the use of external subatmospheric pressure, the inner walls are wetted with the cooling medium by means of a contacting device or spraying mechanism.

The apparatus utilized for conducting this process is characterized in that a hose line or pipeline is extended through the extruding tool into the hollow article, and the end of the hose or pipe projecting from the tool is provided with outlet openings.

By the penetration of the cooling medium into the inner chambers of the hollow article, uniform cooling is made possible from the inside, as well as the outside. In this connection, the extension of the hose line through the extrusion device into the internal chamber of the hollow article is advantageous. However, the cooling medium can also be fed from the open end of the hollow article, the internal cooling beginning in the zone of the counter sizing die.

When executing the sizing procedure with the use of internal pressure, a cooling mandrel can be employed as the contacting means, which cooling mandrel has the cooling medium flowing therethrough and is provided with sealing means at the ends thereof, so that a flow, preferably a countercurrent flow, of the cooling medium is produced in the inner chamber. This cooling mandrel is fixedly attached to the end of the hose line extended through the extruder into the inner chamber of the hollow article and is connected to the extruder so that the position of the mandrel is not changed during the extrusion process.

In contrast thereto, as the sizing procedure is conducted with the use of an external vacuum, the hose line is suitably provided at the end with small orifices from which the cooling medium is sprayed. However, in place of the small orifices, it is also possible to employ a spray nozzle in an advantageous manner. In contrast thereto, if a contacting means is provided at the end of the hose line, this means can also be utilized for wetting the inner walls of the hollow article with the cooling medium and thus cooling these walls. For this purpose, sponges, textile articles, or the like are suitable which contact the walls of the inner chamber and have the cooling medium flowing therethrough.

The apparatus is preferably inclined in its horizontal central axis, so that the consumed cooling medium is discharged toward the free end of the hollow article.

The advantages of this process reside in a reduction of the post shrinkage in the longitudinal and transverse extensions, as well as of the troublesome deformations of the cross-sectional shape. In case of cross sections which are not radially symmetrical, warping in the axial direction is likewise avoided. Due to the more intense cooling taking place simultaneously from the inside and from the outside, a considerable increase of the extrusion speed is also made possible.

It has now been discovered that it is possible to obtain an increase in the dimensional accuracy, as well as a more satisfactory contact with the sizing device and a concomitantly more intense external cooling effect by providing that the gauge or sizing tool exhibits a minor conicity, so that the inlet opening of the gauge for the extruded profiled product is larger than the outlet opening. The conicity is to be of just such an extent that the shrinkage of the profiled article, caused by the cooling effect, is exactly compensated, and the extruded profile contacts the walls of the sizing tool within the entire sizing range, so that the aforementioned advantages can be attained. In this connection, it is of no importance whether the sizing step is executed with the use of an external vacuum or an internal pressure. However, in some cases, a cooling mandrel or a cooling nozzle holder, which is attached to the extruder and thus cannot change its position in the sizing zone, must be adapted to this conicity of the gauge.

The invention will be explained in greater detail below with reference to the embodiment illustrated in the drawings.

FIG. 3a illustrates a device wherein a hollow article is sized with the use of vacuum and is internally cooled with the use of a cooling nozzle holder.

FIG. 3b shows a section along the axis A—A' of the device shown in FIG. 3a.

In FIG. 4a, the internal cooling of a hollow article by means of a further cooling nozzle holder is shown.

FIG. 4b is a sectional view of the device shown in FIG. 4a.

Figure 1:
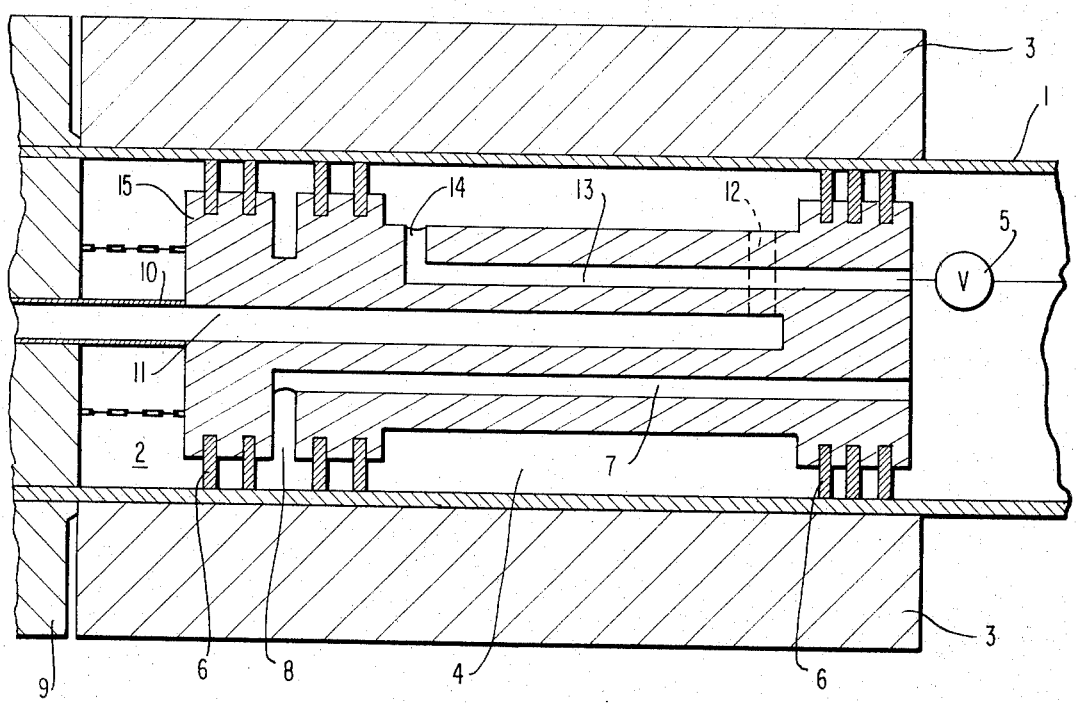
FIG. 1 shows a hollow article sized by the use of internal pressure, which article is cooled from the inside and from the outside.

In the sizing of an article with the use of internal pressure as shown in FIG. 1, a cooling mandrel 15 is first introduced into the hollow article 1 exiting from the extruder 9. The cooling mandrel 15 can be attached to the extruding tool 9 by means of chains or the like, so that the mandrel position remains unchanged during the extrusion. At the ends of the mandrel are provided one or several seals or gaskets 6, by means of which the inner chamber of the hollow article 1 is sealed off. Supporting air can be introduced into the space 2 disposed between the cooling mandrel 15 and the extruder tool 9 and thereby, the hollow article 1 is brought into contact within an externally cooled sizing device or gauge 3. A space 4 is provided between the cooling mandrel 15 and the hollow article 1. The cooling medium, preferably cold water, is conducted into the bore or fluid passageway 11 in the cooling mandrel 15 via a hose line 10 extended through the extruding tool 9 and through openings 12 in communication with the bore 11, the cooling water enters the space 4. In place of the opening 12, it is possible to provide an outlet slot extending all around the cooling mandrel 15. The cooling medium entering the space 4 produces therein a supporting pressure which is smaller than the air pressure ambient in space 2, but depends, with respect to its magnitude, on the wall thickness and the extrusion speed of the hollow article 1. The consumed cooling medium enters, through apertures 14, which, like openings 12 can be replaced by an inlet slot, into the bore or fluid passageway 13 in the cooling mandrel 15 and is thus discharged from the hollow article 1. The quantity of cooling medium flowing through the system is initially determined by means of a throttle 5. The cooling medium and the supporting air exiting, via the sealing elements 6, on the side of the cooling mandrel 15 facing the extruding tool 9 enter into a space 8 provided between the sealing elements 6 annularly around the cooling mandrel 15. The space 8 is in communication with the side of the cooling mandrel 15 facing the free end of the hollow article, via an overflow duct or fluid passageway 7, so that any exiting cooling medium and supporting air can be discharged via the duct 7. The consumed cooling medium, as well as leakage water and air losses, are removed through the free end of the hollow article by inclining the plant.

The openings 12 in the cooling mandrel 15 preferably terminate in the portion of space 4 facing the free end of the hollow article, whereas the discharge apertures 14 are arranged at the part of the space 4 facing the extruding tool 9, so that a flow direction of the cooling medium is produced which is opposed to the extrusion direction, whereby the occurrence of stresses and warping is extensively reduced; this is so because the hotter part of the hollow article 1 first comes into contact with cooling medium which has already given up most of its cooling power and thus cools down more uniformly.

Figure 2:
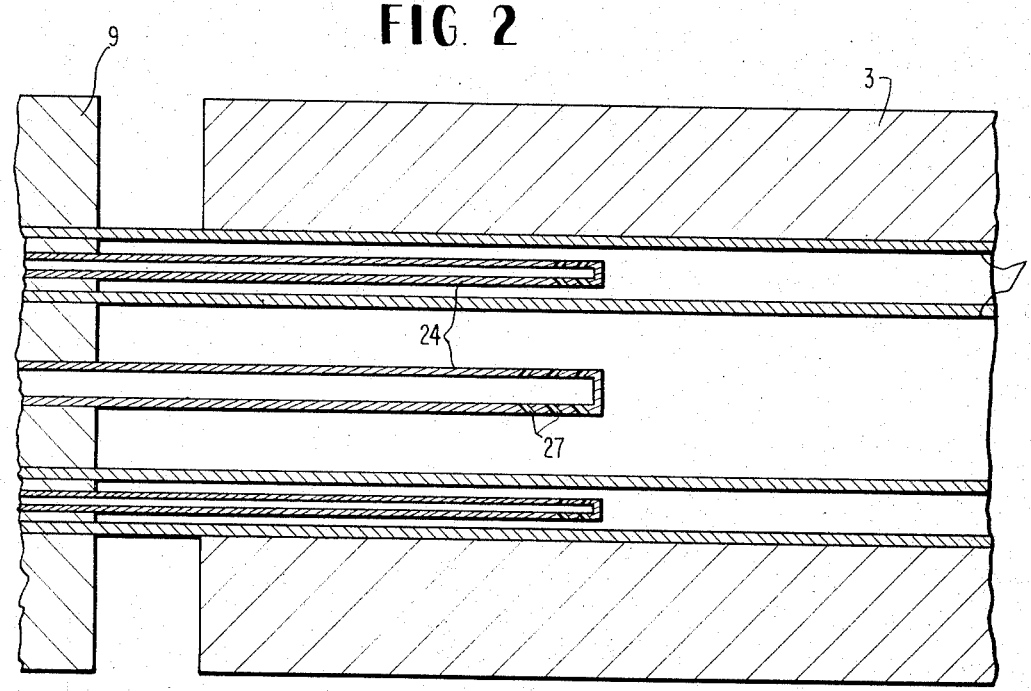
FIG. 2 shows a hollow article sized with the use of vacuum, the inner chambers of this article being cooled from the inside.

FIG. 2 shows the cooling of a hollow article 1 with the use of subatmospheric pressure. In this embodiment, a hollow article 1 is illustrated having two small inner chambers and one large inner chamber. This article exits from the extruder tool 9 and is brought into contact with the inside of an externally cooled gauge 3 by means of a vacuum. This guage 3 is provided with openings, which are not illustrated, through which the vacuum present within the gauge 3 is effective on the hollow article 1. Hoses 24 extend into the inner chambers of the hollow article 1, which hoses pass through the extruder 9. The ends of the hoses 24 are provided with apertures 27 preferably oriented in the extrusion direction. The cooling medium exits from these apertures 27 and is thus brought into contact with the inner walls of the hollow article 1. The amount of coolant introduced is, in turn, dependent on the wall thickness and the extrusion speed of the hollow article and is controlled by means of a pressure-regulating valve.

The ends of the hoses 24 can be provided with a spray nozzle in order to ensure satisfactory contact of the coolant with the inner walls. However, in place of the spray nozzles, it is also possible to arrange sponges, plugs of a textile material, or the like, through which cooling medium flows. At the ends of the hose, which are in the zone of the gauge, the water exits in metered amounts, since the quantity of the water flowing through the system is predetermined by the pressure-regulating valve. The plant is suitably inclined about its central axis so that the coolant flows off toward the free end of the hollow article.

Under certain circumstances, it is advantageous to start with the internal cooling later than with the external cooling, in order to keep the warpage at a minimum. For this purpose, the individual hoses 24 can have different lengths and can also be provided with openings 27 at different places, so that the cooling of the inner walls is initiated at different points.

Furthermore, it is possible to provide a cooling nozzle holder in place of the spray nozzles or contacting means disposed at the hose ends; this is illustrated in FIG. 3a through 4b.

According to the figures, a hollow article 1 is produced having several inner chambers 40. The hollow article 1 exiting from the extruder is brought into contact with the sizing device by means of vacuum in a cooled gauge 3. The gauge is provided with openings through which the vacuum present within the gauge is effective on the hollow article 1.

In the hollow article 1, a cooling nozzle holder 30 is attached to the extruding tool, for example, by means of a chain 31. The feed hose 32 is connected with the cooling nozzle holder 30 and supplies coolant thereto. Cooling nozzles 34 are mounted at the cooling nozzle holder 30, from which the cooling medium is sprayed against the inner walls of the hollow article. The spray nozzles 34 are disposed at different places on the cooling nozzle holder 30, so that the cooling of the inner wall of the hollow article takes place simultaneously at several points, and the cooling of the outer wall is effected in the entire zone of the vacuum sizing device 3. The cooling nozzle holder can exhibit fins or ribs 37, by means of which it slides along inside the hollow article. Between the holder and the inner walls of the hollow article there is only a small gap 36 which is then filled by the cooling medium sprayed by the spray nozzles.

Due to the fact that the cooling of the hollow article 1 is initiated simultaneously from the inside and from the outside, the article shrinks during its passage through the gauging zone. If the gauge did not have a conical configuration, an ever increasing gap would be formed between the hollow article 1 and the gauge 3 toward the exit end of the sizing device, whereby a sufficient external cooling would no longer be achieved.

For this reason, it is advantageous to impart to the gauge 3 a minor conicity, so that its inlet opening is larger than its exit opening. This conicity is to be just sufficient to compensate for the shrinkage of the hollow article 1, so that the hollow article 1 still contacts the walls of the sizing device even at the outlet end of the device. In the extrusion of hard PVC profiles, for example, sizing devices or gauges of a length of 800 mm were utilized, the inlet width of which was 72.6 mm., whereas the width of the exit opening was 72.2 mm., so that the shrinkage of the hard PVC profile of 0.4 mm. occurring in the sizing zone of a length of 800mm. was compensated.

The cooling nozzle holder 30 can be adjusted, for example, by the appropriate choice of its height and width in such a manner that there is always preserved a gap between the walls of the hollow article 1 and the cooling nozzle holder.

As illustrated in FIGS. 4a and 4b, it is also impossible to utilize, as the cooling nozzle holder 30, a component, the largest part of which does not fill the entire profile. In this embodiment, the part 35 of the cooling nozzle holder 30 serves as a displacement means in order to effect as low a consumption in cooling medium as possible, just as the device in FIGS. 3a and 3b. The bottom part of this cooling nozzle holder is likewise provided with fins or ribs 37 which can also be arranged laterally of the displacement element 35. The fins 37 are suitably interrupted by a groove 33, so that a passage for the cooling water is provided by the groove 33. The cooling nozzles 34, which are disposed on the displacement element 35, are oriented in the extrusion direction of the hollow article. Thereby, as large an inner wall area of the hollow article as possible is sprayed with the cooling medium.

In FIGS. 3b and 4b, two profiles with inner chambers 40 are simultaneously illustrated, wherein there is no cooling nozzle holder 30, which chambers can likewise be cooled. If the inner chamber of the hollow article is provided with lugs or webs, the cooling nozzle holder is to be adapted to this inner profile. The profiles illustrated in FIGS. 3b and 4b can be extruded, according to the illustrated process, solely by the internal cooling of the large inner chamber, approximately 4 to 7 times faster than without internal cooling. When cooling the additional inner chambers 40, the extrusion speed can be additionally considerably increased.

The external sizing means can be controlled by way of electrical contacts to adjust the exactly required temperature via a thermostat or the like. This is necessary, since the cooling effect by the cooling medium in the inner chambers of the hollow article 1 is always limited, so that a uniform complete cooling of the hollow article is generally ensured only if the temperature of the outer sizing means 3 is correspondingly increased.

For the hoses 10, 24 and 32 a material is to be employed which withstands the high extrusion temperatures. For example, appropriate plastic hoses can be utilized. However, in place of hoses, it is also possible to use metallic pipes.

We claim:

1. An apparatus for the extrusion of hollow articles of thermoplastic synthetic resin, comprising:

an extruding tool from which said thermoplastic material is drawn to define an article having at least one inner chamber therein;

a sizing gauge contacting the external surface of said drawn material for controlling the external dimensions of said article as it is drawn from said extruding tool, the interior cross section of said gauge where the material enters said gauge being greater than the interior cross section of said gauge where the material exits said gauge, so as to compensate for the shrinkage of said material; and means, physically coupled to said material passing through said sizing gauge for providing cooling of said material during the passage of said material through said gauge, including a cooling mandrel, disposed within said at least one chamber of said thermoplastic article, and having at least a first fluid passageway therein for directing a cooling fluid against the interior of said article as it passes through said sizing gauge, said cooling mandrel having an external cross section over a section thereof which is less than the internal cross section over a section thereof of said article, to thereby define a space between said mandrel and said article, and wherein said first fluid passageway of said mandrel fluidly communicates with said space, whereby said cooling fluid may pass therethrough and directly contact the interior surface of said article.

2. An apparatus according to claim 1, wherein said mandrel further includes a second fluid passageway disposed therein and in fluid communication with said space for conducting fluid directed into said space from said first fluid passageway and discharging said cooling fluid from said mandrel.

3. An apparatus according to claim 2, wherein the location on said mandrel at which said first fluid passageway communicates with said space is adjacent that portion of the interior of said article having a temperature lower than that portion of the interior of said article adjacent the location on said mandrel at which said second fluid passageway communicates with said space.

4. An apparatus according to claim 3, further including means connected to said extruding tool and said cooling mandrel, for maintaining the location of contact of said cooling fluid against the interior of said article relative to the place at which said article exits said tool substantially constant during the passage of said article through said sizing gauge.

5. An apparatus according to claim 4, wherein said mandrel further includes at least first and second seals contacting the outer surface of said mandrel and the inner surface of said article on each side of said space, to thereby form a cooling chamber with which said first and second fluid passageways contact said space.

6. An apparatus according to claim 5, further including at least a third seal disposed between the interior of said article and said mandrel at the end thereof adjacent said extruding tool to thereby define a supporting air space.

7. An apparatus according to claim 6, wherein said mandrel further includes a third fluid passageway disposed therein and communicating between a space located between said third seal and one of said first and second seals and the exterior of said mandrel to provide an overlfow duct for said cooling fluid and air in said supporting air space.

8. An apparatus according to claim 3, further including a throttle coupled to one of said first and second fluid passageways for controlling the flow of cooling fluid through said mandrel.

9. An apparatus according to claim 8, further including an inlet hose connected to said first fluid passageway for conducting cooled water thereto.

10. An apparatus according to claim 3, wherein said cooling means further includes means for externally cooling said sizing gauge so as to provide cooling for the exterior surface of said article.

11. An apparatus for the extrusion of hollow articles of thermoplastic synthetic resin, comprising:
an extruding tool from which said thermoplastic material is drawn to define an article having at least one inner chamber therein;
a sizing gauge contacting the external surface of said drawn material for controlling the external dimensions of said article as it is drawn from said extruding tool, the interior cross section of said gauge where the material enters said gauge being greater than the interior cross section of said gauge where the material exits said gauge, so as to compensate for the shrinkage of said material; and
means, physically coupled to said material passing through said sizing gauge for providing cooling of said material during the passage of said material through said gauge including at least one cooling hose extending into said at least one chamber of said article, provided with apertures therein for directing a cooling fluid towards the interior surface of said chamber, said at least one hose passes through said extruding tool and is mounted a constant distance with respect thereto during the passage of said article therefrom.

12. An apparatus according to claim 11, wherein said at least one hose further includes a spray nozzle mounted thereon for directing said fluid toward said article.

13. An apparatus according to claim 11, wherein said at least one hose includes a sponge mounted thereon for conducting fluid to the surface of said article.

14. An apparatus for the extrusion of hollow articles of thermoplastic synthetic resin, comprising:
an extruding tool from which said thermoplastic material is drawn to define an article having at least one inner chamber therein;
a sizing gauge contacting the external surface of said drawn material for controlling the external dimensions of said article as it is drawn from said extruding tool, the interior cross section of said guage where the material enters said gauge being greater than the interior cross section of said gauge where the material exits said gauge, so as to compensate for the shrinkage of said material; and means physically coupled to said material passing through said sizing gauge for providing cooling of said material during the passage of said material through said gauge, including a plurality of hoses extending into said at least one chamber of said article, at least two of which have different lengths, said at leest two hoses being provided with apertures therein for directing a cooling fluid towards the interior surface of said chamber to thereby enable cooling of said article at different points.

15. An apparatus for the extrusion of hollow articles of thermoplastic synthetic resin, comprising:
an extruding tool from which said thermoplastic material is drawn to define an article having at least one inner chamber therein;
a sizing gauge contacting the external surface of said drawn material for controlling the external dimensions of said article as it is drawn from said extruding tool, the interior cross section of said gauge where the material enters said gauge being greater than the interior cross section of said gauge where the material exits said gauge, so as to compensate for the shrinkage of said material; and
means, physically coupled to said material passing through said sizing gauge for providing cooling of said material during the passage of said material through said gauge including a plurality of hoses extending into said at least one chamber of said article, at least two of of said hoses having apertures provided at different points to thereby enable cooling of said article at different points by directing a cooling fluid towards the interior surface of said chamber.

16. An apparatus for the extrusion of hollow articles of thermoplastic synthetic resin, comprising:
an extruding tool from which said thermoplastic material is drawn to define an article having at least one inner chamber therein;
a sizing gauge contacting the external surface of said drawn material for controlling the external dimensions of said article as it is drawn from said extruding tool, the interior cross section of said gauge where the material enters said gauge being greater than the interior cross section of said gauge where the material exits said gauge, so as to compensate for the shrinkage of said material; and
means, physically coupled to said material passing through said sizing gauge for providing cooling of said material during the passage of said material through said gauge including a cooling nozzle holder attached to said extruding tool provided with a plurality of cooling nozzles communicating with a source of cooling fluid through a corresponding feed hose provided at different points thereon so that the cooling of said interior surface of said article takes place simultaneously at different points.

17. An apparatus according to claim 16 wherein said sizing gauge further includes means for maintaining a vacuum between said sizing gauge and the exterior surface of said article.

18. An apparatus according to claim 17, wherein said nozzle holder further includes cooling fins and ribs by means of which said holder is slidably mounted on the inside of said article.

19. An apparatus for the extrusion of hollow articles of thermoplastic synthetic resin, comprising:

an extruding tool from which said thermoplastic material is drawn to define an article having at least one inner chamber therein;

a sizing gauge contacting the external surface of said drawn material for controlling the external dimensions of said article as it is drawn from said extruding tool, the interior cross section of said gauge where the material enters said gauge being greater than the interior cross section of said gauge where the material exits said gauge, so as to compensate for the shrinkage of said material, said sizing gauge including means for maintaining a vacuum between said sizing gauge and the exterior surface of said article; and means, physically coupled to said material passing through said sizing gauge for providing cooling of said material during the passage of said material through said gauge including at least one cooling hose extending into said at least one chamber of said article, provided with apertures therein for directing a cooling fluid towards the interior surface of said chamber.

* * * * *